UNITED STATES PATENT OFFICE.

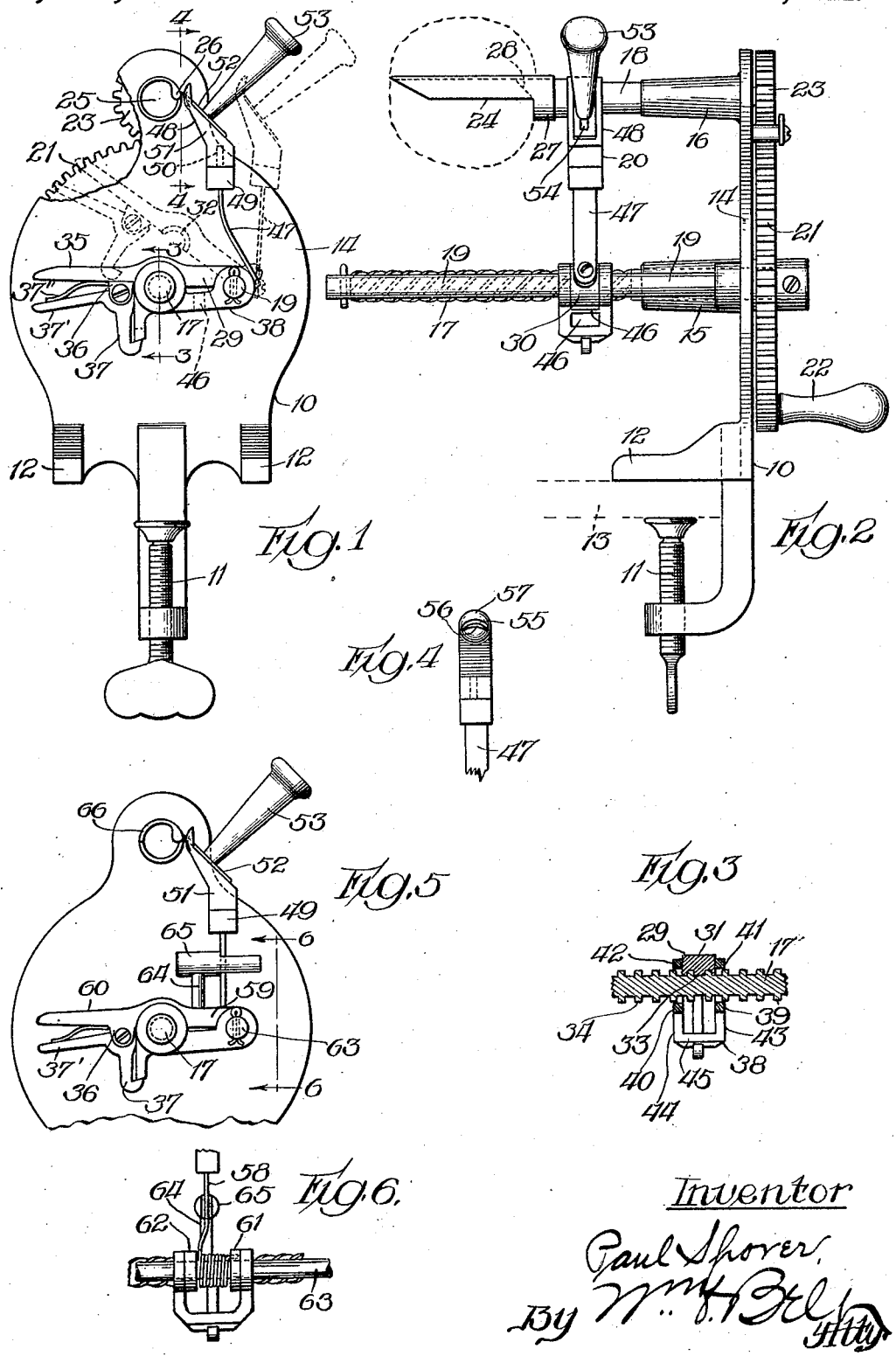

PAUL SPORER, OF CHICAGO, ILLINOIS.

FRUIT AND VEGETABLE PARER.

1,399,902.     Specification of Letters Patent.     Patented Dec. 13, 1921.

Application filed July 15, 1920. Serial No. 396,434.

*To all whom it may concern:*

Be it known that I, PAUL SPORER, a citizen of Jugo-Slavia, residing at Chicago, in the county of Cook, State of Illinois, have invented certain new and useful Improvements in Fruit and Vegetable Parers, of which the following is a specification.

This invention relates to devices for paring or peeling fruits and vegetables and particularly potatoes and has for its primary object to provide a simple and efficient article which can be manufactured at a very small cost thus making it available for household purposes.

An important object is to provide a cutter support which may be fed longitudinally of the axis of the holder in either direction or may be readily moved by the operator in a similar manner independently of the feeding means.

Further objects are, to provide cutting means and mounting therefor which will follow any irregularities in the contour of the fruit or vegetable on the holder, to facilitate adjustment of the cutting blade, to provide simple and convenient means to provide means for removing the core of an apple at the completion of the peeling operation.

The many other objects and advantages of my invention will be readily appreciated as it is better understood by reference to the following specification when read in connection with the accompanying drawing illustrating the selected embodiment thereof in which:

Figure 1 is a side elevation of the invention,

Fig. 2 is a front elevation of this invention,

Figs. 3 and 4 are detail views,

Fig. 5 is a side elevation of a modified form of the invention,

Fig. 6 is a detail view of a portion of the invention as shown in Fig. 5.

Referring to the drawing the main frame 10 is provided with a lower clamping member 11 co-acting with lugs 12 formed on such frame to permit the device to be secured upon a table 13 or other similar form of support. A plate 14 projects upwardly from the frame 10 and on this plate are formed bearings 15 and 16 for the cutter feed shaft 17 at the holder shaft 18. A guide shaft 19 for the cutter carrier 20 is mounted upon the plate 14. A driving gear 21 is secured upon the shaft and this gear is provided with an operating handle 22. The gear 23 secured upon the shaft 18 is in mesh with the gear 21. This gear 23 is preferably smaller in diameter and provided with a less number of teeth than the gear 21 in order that the shaft 18 may rotate at a higher rate of speed than the feed shaft 17.

The shaft 18 is provided at its end with a vegetable holder 24 which, in the present embodiment, is in the shape of a curved blade as is usual in apple corers.

The edge 25 of the holder 24 is sharpened to remove the core of the apple when such apple is rotated in a clockwise direction relative to the holder. The opposite edge 26 of the holder, is preferably blunted so that the resistance of the cutter during the peeling operation will not cause the corer to cut its way through the apple. This holder 24 has a sleeve 27 formed on the base thereof to fit about the outer end of the shaft 18 and the portion of the holder on which the article to be pared is retained is preferably in the form of an arc of not exceeding 180° in order that the core of the apple shall not be retained therein after the coring operation has been completed and the apple removed. An inclined block 28 is preferably secured within the shank of the holder to cause any portion of the core remaining in the holder to be forced out by the insertion of a new apple or other article to be pared upon the holder. When a potato or other article having no core is being pared, this article is merely drawn off longitudinally of the holder upon the completion of the paring.

The cutting or peeling mechanism comprises a cutter supporting member 29 which has its forward end 30 pivotally mounted on the shaft 19 and freely slidable longitudinally of such shaft. The central portion 31 of this member 29 is formed with arcuate groove 32 having interrupted threads 33 on the walls thereof to mesh with the threads 34 on the shaft 17 when such threads are in engagement therewith. The inner end portion 35 of this member 29 forms a handle to enable the operator to lift the member 29 out of engagement with the threads on the shaft 17. Downwardly projecting lugs 36 are formed on the handle to support a latch 37 pivotally mounted therein and having an operating arm 37' extending beneath the end portion 35 of the upper member 29.

A spring 37″ acts between the members 35 and 37′ to cause the latch to engage the lower member.

A lower member 38 comprises parallel plates 39 and 40 each provided substantially at one end with enlarged portions in which are formed the perforations 41 and 42 respectively fitting over the threaded portion of the shaft 17 and freely slidable longitudinally thereof. The opposite ends of such plates 39 and 40 are likewise enlarged and perforated to slidably fit about the shaft 19. These plates 39 and 40 have downwardly projecting lugs 43 and 44 respectively connected by the cross piece 45 which is engaged by the latch 37 when the upper member 29 is in its lower or operative positions, as is shown in solid lines in the drawings.

The plates 39 and 40 are likewise connected by a cross piece 46 intermediate their ends.

A spring arm 47 has its lower extremity secured to the outer end of the member 29 and projects upwardly therefrom. The cutter member 48 is secured to the upper extremity of this arm 47 and comprises a stationary base 49 directly secured to the arm 47 and having a pivot pin 50 seated in the upper face thereof and projecting upwardly therefrom. A blade supporting member 51 has its lower extremity provided with a socket to receive the pin 50 and form a pivoted connection between the base 49 and the member 51. The cutting blade 52 rests upon the inclined upper face of this member 51 and is secured thereto by the handle 53 having its lower threaded end passing through the slot 54 in the blade and fitting a tapped hole in such upper face. This handle in addition to forming the adjusting and binding screw for the blade, is adapted to be grasped by the operator to control the movement of such blade during the operation of the device. The blade 52 has its narrow cutting end 55 passing through the opening 56 in the cutter guard 57 formed at the upper extremity of the member 51. This guard preferably is a mere narrow strip or ring adjacent to or about the blade to permit it to enter the eye recesses of potatoes or in other small irregularities in the surface of the article and in the selected embodiment this ring has a spherical formation to facilitate the entry of the blade into such recesses and its departure therefrom. The cutting end of the blade is preferably curved for the purpose stated in connection with the guard, as is best shown in Fig. 4.

The cutter member will normally be in the position indicated in solid lines in the drawing. When this cutter member engages the article to be pared such cutter is forced outwardly against the action of the spring arm 47, by the contour of the article, and the cutter blade will always be held in yielding engagement with such article.

While the cutter will automatically turn on its pivot 50 to properly present the blade to the surface of the article as such article comes into contact with the cutter and during the succeeding paring operation this movement may be assisted and the cutter guided in its operation by the operator grasping the handle 53.

In Figs. 5 and 6 of the drawing I have shown a modified form of the device in which a round wire spring arm 58 is substituted for the flat spring arm 47 of the previous embodiment. The forward end 59 of the upper member 60 is split and bent outwardly to form spaced perforated arms 61 and 62 which slidably fit about the guide rod 63 and form the pivoted connection for such member. The lower portion of the spring arm 58 is coiled about the rod 63 and the lower extremity of such spring arm is seated in the arm 61. I have provided a guide for the arm comprising a post 64 on the upper extremity thereof. This permits the cutter to move to or from the axis of the vegetable holder 66 but prevents movement longitudinally of the axis of such holder. No such guide is necessary when the flat spring arm of the previous embodiment is used for the formation of the arm prevents such motion.

In the operation of the device the cutter support is moved longitudinally of the feed shaft into the position indicated by solid lines in Fig. 2. This is accomplished by grasping the members 35 and 37′ to release the latch 37 swinging the member 29 upwardly on its pivot to disengage the interrupted threads on such upper member from the threads on the shaft 17, as indicated by dotted lines in Fig. 1. The cutter support can then be freely moved in either direction on such shaft 17. An apple, potato or other article of a similar nature is now forced upon the free end of the holder 24 into the position indicated by dotted lines in the drawings. The cutter is now fed to the article by rotating the gear 21 in the proper direction. When the cutter guard contacts with the article upon the holder, it will automatically turn the blade holder upon the pivot pin 50 to properly position the blade relative to the surface of such article but this positioning may be anticipated by the operator through the medium of the handle 53. When the peeling has been completed the article may be drawn off of the holder, or if a core is to be removed, such article is twisted by the operator relative to the holder in a clockwise direction, removing the core in the manner common to this type of apple corers. The holder normally is revolved in a clockwise direction so that the resistance of the cutting operation tends to turn the article counter clockwise relative to the holder. I have therefore formed the edge 26 of the holder blunt so that this resistance will not cause the holder or corer to move relative to the article thereon during the peeling operation. The small face of the cutter guard and narrow blade end permits the device to successfully peel potatoes which are the most difficult on account of their deep eye recesses and general irregular contour. The cutting blade may be adjusted by partially unscrewing the handle 53, sliding the blade upon the face of the blade support 51 to the desired position, and then tightening the handle.

The advance of the threads on the feed shaft would depend upon the ratio of the gears 21 and 23 but it is advisable to have the cutting blade advance the width of its face during one revolution of the article to be pared.

I am aware that a considerable number of changes in the construction and arrangement of parts might readily be made by any one skilled in the art without departing from the scope of my invention and I do not care to be limited to the particular embodiments herein shown and described.

I claim:

1. A vegetable parer comprising a support, a revoluble vegetable holder mounted on said support, a cutter carrier movable longitudinally of the axis of said holder, a blade having a narrow cutting end, and a substantially spherical guard about the cutting end of said blade.

2. A vegetable parer comprising a support, a revoluble vegetable holder, mounted on said support, a cutter carrier movable longitudinally of the axis of said holder, a substantially spherical guard plate on said carrier having a slot therethrough, and a flat blade having its cutting end projecting through the slot in said guard.

3. A vegetable parer comprising a support, a revoluble vegetable holder mounted on said support, a cutter carrier movable longitudinally of the axis of said holder, a spring arm mounted on said carrier, a blade holder mounted on the outer extremity of said arm and yieldingly movable to and from the axis of said holder, a cutting blade on said blade holder, and guiding means for said arm.

4. A vegetable parer comprising a support, a revoluble vegetable holder on said support, a cutter carrier movable longitudinally of the axis of said holder, a spring arm mounted on said carrier, a blade holder revolubly mounted on the outer extremity of said arm, a cutting blade seated on said blade holder, and an adjusting screw for said blade having a handle formed thereon.

5. A vegetable parer comprising a support, a revoluble vegetable holder on said support, and a cutter carrier movable longitudinally of the axis of said holder comprising a worm shaft, a guide shaft parallel with said worm shaft, a lower member having one end slidably mounted on said worm shaft and its opposite end slidably mounted on said guide shaft, an upper member pivotally mounted on said guide shaft and provided with an interrupted thread adapted to mesh with the threads on said worm shaft, when moved into engagement therewith, and means for locking said members together to cause said carrier to be operated by said worm shaft.

6. A vegetable parer comprising a support, a revoluble vegetable holder on said support, and a cutter carrier movable longitudinally of the axis of said holder comprising a worm shaft having its axis parallel with the axis of said holder, a guide shaft parallel with said worm shaft, a lower member having one end slidably mounted on said worm shaft and the opposite end slidably mounted on said guide shaft, an upper member pivotally mounted on said guide shaft and slidable thereon, interrupted threads formed on said upper member adapted to mesh with the threads on said worm shaft when said upper member is moved into engagement therewith, and means on said upper member for engaging said lower member to lock said members together and to retain said upper member in engagement with said worm shaft.

7. A vegetable parer comprising a support, a revoluble vegetable holder on said support, and a cutter carrier movable longitudinally of the axis of said holder comprising a worm shaft mounted on said support and having its axis parallel with the axis of said holder, a guide shaft parallel with said worm shaft, a lower member having one end slidably mounted on said worm shaft and its opposite end slidably mounted on said guide shaft, an upper member pivotally mounted on said guide shaft and slidable thereon, interrupted threads formed on said upper member adapted to mesh with the threads on said worm shaft when said upper member is moved into engagement therewith, cutter supporting means mounted on said upper member, means for locking said members together and said upper member in engagement with said worm shaft, and means for actuating said worm shaft.

PAUL SPORER.